(12) United States Patent
Sugita et al.

(10) Patent No.: US 10,953,363 B2
(45) Date of Patent: Mar. 23, 2021

(54) METHOD FOR INSTALLING SPRAY PIPE

(71) Applicant: MITSUBISHI HITACHI POWER SYSTEMS, LTD., Yokohama (JP)

(72) Inventors: Satoru Sugita, Yokohama (JP); Tetsu Ushiku, Yokohama (JP); Ryozo Sasaki, Yokohama (JP); Naoyuki Yoshizumi, Yokohama (JP); Tsuyoshi Miyachi, Yokohama (JP); Seiji Kagawa, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/615,212

(22) PCT Filed: Jul. 12, 2018

(86) PCT No.: PCT/JP2018/026376
§ 371 (c)(1),
(2) Date: Nov. 20, 2019

(87) PCT Pub. No.: WO2019/013297
PCT Pub. Date: Jan. 17, 2019

(65) Prior Publication Data
US 2020/0171425 A1 Jun. 4, 2020

(30) Foreign Application Priority Data
Jul. 14, 2017 (JP) .............................. JP2017-138246

(51) Int. Cl.
*B05B 15/60* (2018.01)
*B01D 53/18* (2006.01)
(Continued)

(52) U.S. Cl.
CPC ....... *B01D 53/185* (2013.01); *B01D 53/1456* (2013.01); *B01D 53/505* (2013.01);
(Continued)

(58) Field of Classification Search
CPC .. B05B 15/60; B01D 53/185; B01D 53/1456; B01D 53/505; B01D 53/78
See application file for complete search history.

(56) References Cited

U.S. PATENT DOCUMENTS 2,005,699 A * 6/1935 Gottwald .................. F16L 7/00
  285/61
5,271,873 A * 12/1993 Nelson ................. B01D 53/504
  261/116
(Continued)

FOREIGN PATENT DOCUMENTS

| JP | 9-225256 A | 9/1997 |
| JP | 11-141746 A | 5/1999 |
| JP | 6215503 B1 | 10/2017 |

OTHER PUBLICATIONS

International Search Report dated Sep. 18, 2018, issued in counterpart International Application No. PCT/JP2018/026376 (2 pages).
(Continued)

*Primary Examiner* — Jason L Vaughan
*Assistant Examiner* — Amanda Kreiling
(74) *Attorney, Agent, or Firm* — Westerman, Hattori, Daniels & Adrian, LLP

(57) ABSTRACT

A method for installing a spray pipe, including an insertion step of inserting a spray pipe from an opening portion, a positioning step of positioning the spray pipe such that an installation surface of a leg portion faces a supporting surface of a supporting portion, a provisional tightening step of provisionally tightening a first fastening portion to couple an attachment flange with the opening portion, an adjusting step of adjusting the height of the installation surface relative to the supporting surface such that an axis along which a pipe portion extends coincides with the horizontal plane, in the provisionally tightened state resulting from the provisional tightening step, a coupling step of coupling the
(Continued)

leg portion to the supporting portion by means of a second fastening portion, after the adjusting step, and a final tightening step of performing a final tightening of the first fastening portion after the coupling step.

6 Claims, 14 Drawing Sheets

(51) Int. Cl.
    *B01D 53/14*     (2006.01)
    *B01D 53/50*     (2006.01)
    *B01D 53/78*     (2006.01)
    *B05B 1/20*     (2006.01)

(52) U.S. Cl.
    CPC ................ *B01D 53/78* (2013.01); *B05B 1/20* (2013.01); *B05B 15/60* (2018.02); *B01D 2252/1035* (2013.01); *Y10T 29/49428* (2015.01)

(56) References Cited

U.S. PATENT DOCUMENTS

| | | |
|---|---|---|
| 6,613,133 B2 | 9/2003 | Piaskowski et al. |
| 2007/0221279 A1* | 9/2007 | Johnson ................ F16L 9/006 138/106 |

OTHER PUBLICATIONS

Written Opinion (Form PCT/ISA/237) of the International Searching Authority dated Sep. 18, 2018, issued in counterpart International Application No. PCT/JP2018/026376 (4 pages).

* cited by examiner

METHOD FOR INSTALLING SPRAY PIPE

TECHNICAL FIELD

The present invention relates to a method for installing a spray pipe.

BACKGROUND ART

An exhaust gas system such as a boiler installed in a power generation facility or the like is provided with a desulfurization device for removing sulfur oxide from the exhaust gas. This allows sulfur oxide contained in the exhaust gas discharged into the atmosphere to be reduced.

In Patent Document 1 and Patent Document 2, disclosed is a liquid column type desulfurization device in which a liquid absorbent is injected upward from a plurality of nozzles provided in a spray pipe (branch pipe, header) installed horizontally, and a chemical reaction between a combustion exhaust gas and the liquid absorbent causes sulfur oxide in the combustion exhaust gas to be removed.

CITATION LIST

Patent Document

Patent Document 1: JP 09-225256 A
Patent Document 2: U.S. Pat. No. 6,613,133

SUMMARY OF INVENTION

Technical Problem

In a liquid column type desulfurization device, a reaction force directed downward is applied to a branch pipe as a liquid absorbent is injected upward. A downward impactive force is also applied to the branch pipe when the upward injected liquid absorbent drops into contact with the branch pipe.

In Patent Document 1 (see FIG. 1, FIG. 2), a branch pipe 5 to which a nozzle 6 injecting a liquid absorbent is attached is supported by a plurality of support rods 9 arranged at intervals below the branch pipe so as to be orthogonal to the branch pipe 5. The respective branch pipes 5 and the support rods 9 in Patent Document 1 are in contact with each other at locations of which outer diameters are circular and which intersect with each other. As such, the branch pipe may be broken (including cracking, localized deformation) by a local force acting on each of the locations in contact with the support rods.

In Patent Document 2 (see FIG. 1, FIG. 3), each of branch pipes (headers) 14 and 15 is supported in a state of being restrained by a U-shaped support strap 34 of which an upper end is coupled to a beam 32. As such, each of the branch pipes 14 and 15 may be broken by a local force acting on a location in contact with the support strap 34. The failure due to this local force acting is particularly pronounced in a case that a shape of an inner circumferential surface of the support strap 34 and a shape of an outer circumferential surface of the branch pipe 14 or 15 are not matched. The same failures may occur not only immediately after the branch pipe 14 or 15 is constrained to the support strap 34 but also after long-term use due to fatigue failure caused by vibration during operation of the desulfurization device.

In a liquid column type desulfurization device, in order to effectively bring the liquid absorbent into gas-liquid contact with the exhaust gas, it is necessary to accurately position the spray pipe in the horizontal direction and inject the liquid absorbent from the nozzle along the vertical direction.

However, Patent Document 1 and Patent Document 2 do not describe a structure for accurately positioning a spray pipe in a horizontal direction, or a method for installing a spray pipe to accurately position a spray pipe in a horizontal direction.

The present invention has been made in view of such circumstances, and has an object to provide a method for installing a spray pipe to accurately position a spray pipe along a horizontal direction, the method being capable of suppressing such a failure that a breakage is caused by a reaction force and an impactive force applied as a liquid absorbent is injected upward.

Solution to Problem

In order to solve the problem described above, the present invention adopts the following means.

A method for installing a spray pipe according to an aspect of the present invention is a method for installing a spray pipe, the spray pipe injecting a liquid absorbent into an absorption tower which is formed to extend in a vertical direction and serves as a passage for exhaust gas, the spray pipe including a cylindrical pipe portion extending along an axis line and including a leading end closed, a leg portion disposed on a lower end portion in a vertical direction of the pipe portion including an installation surface, and an attachment portion disposed at the pipe portion and including a first attachment surface, and the absorption tower including an opening portion opened toward a side of absorption tower, a second attachment surface disposed at the opening portion, and a supporting portion including supporting surface supporting the pipe portion, the method including a step of inserting the spray pipe from the opening portion, a positioning step of positioning the spray pipe such that a state is established in which the installation surface of the leg portion faces the supporting surface of the supporting portion, a provisionally tightening step of provisionally tightening a first fastening portion, in a state in which the first attachment surface of the attachment portion faces the second attachment surface of the opening portion, to couple the attachment portion to the opening portion, an adjusting step of adjusting a height of the installation surface relative to the supporting surface such that the axis line along which the pipe portion extends coincides with a horizontal plane, in the provisionally tightened state resulting from the provisionally tightening step, a coupling step of coupling the leg portion to the supporting portion with a second fastening portion after the adjusting step, and a finally tightening step of finally tightening the first fastening portion after the coupling step.

According to the method for installing a spray pipe according to an aspect of the present invention, the attachment portion of the spray pipe and the opening portion of the absorption tower are coupled by provisionally tightening the first fastening portion in the provisionally tightening step, and the axis line along which the pipe portion extends, in the provisionally tightened state, is adjusted to coincide with the horizontal plane in the adjusting step. The opening portion, which has a flange structure, for example, can fix the absorption tower and the spray pipe the most rigidly as compared to the other supporting portions, and therefore, provisionally determining initially the position of the spray pipe with the opening portion is effective to accurately attain the horizontality. The leg portion is coupled to the supporting portion after the adjusting step, and therefore, a state in which the axis line along which the pipe portion extends coincides with the horizontal direction can be reliably maintained. The first fastening portion is fastened after coupling the leg portion to the supporting portion, and therefore, the adjustment in the adjustment step is easy and the failure that a local stress occurs in the spray pipe when coupling the leg portion to the supporting portion can be suppressed.

As described above, according to the method for installing a spray pipe of the present embodiment in the present invention, it is possible to accurately position the spray pipe along the horizontal direction, the spray pipe being capable of suppressing such a failure that a breakage is caused by a reaction force and an impactive force applied as the liquid absorbent is injected upward.

In the method for installing a spray pipe according to an aspect of the present invention, the leg portion may be disposed at each of a plurality of locations including the leading end of the pipe portion, the absorption tower may include a plurality of the supporting portions each corresponding to the leg portion disposed at each of the plurality of locations, and the coupling step may be of coupling the leg portions to the supporting portions in an order from the leading end toward a base end of the pipe portion.

With this method, after the attachment portion on the base end side of the spray pipe is coupled to the opening portion of the absorption tower, the leg portion is coupled to the support portion at the leading end which is the farthest from the base end. Both ends of the spray pipe can be coupled to the absorption tower to reliably coincide with the horizontal plane, while the spray pipe can be rigidly coupled to the absorption tower at other portions.

The method for installing a spray pipe according to an aspect of the present invention may further include a correction step of correcting an angle of the second installation surface such that the axis line along which the pipe portion extends coincides with a horizontal plane before coupling the attachment portion to the opening portion in the provisionally tightening step.

With this method, the attachment portion of the spray pipe is attached to the opening portion of the absorption tower in a state in which the angle of the second installation surface is corrected such that the axis line along which the pipe portion extends coincides with the horizontal plane. Therefore, the spray pipe can be positioned more accurately along the horizontal direction.

In the method for installing a spray pipe according to an aspect of the present invention, the second fastening portion may include a fastening bolt and a pair of fastening nuts fastened on the fastening bolt, an insertion hole into which the fastening bolt is inserted may be formed on the installation surface of the leg portion, the insertion hole may have a length in a direction along the axis line that is longer than a length in a direction orthogonal to the axis line, and the coupling step may be a step of tightening the pair of fastening nuts in a state in which the leg portions are movable along the axis line.

In this way, the leg portions can be coupled to the supporting portion while a state in which the leg portions are movable along the axis line is maintained. Therefore, in the case that the spray pipe is thermally stretched along the axis line due to the heat of the exhaust gas, the failure that a local stress occurs in the spray pipe can be suppressed.

In the method for installing a spray pipe according to an aspect of the present invention, the spray pipe may include a plurality of nozzle holders which are disposed at a plurality of locations of an upper end portion in the vertical direction of the pipe portion and guide the liquid absorbent flowing through the pipe portion in the horizontal direction, upward in the vertical direction, and the method may further include an attachment step of attaching a spray nozzle to each of the plurality of nozzle holders, the spray nozzle injecting the liquid absorbent upward in the vertical direction.

With this method, the spray nozzle can be attached to each of a plurality of nozzle holders included in the spray pipe in a state in which the spray pipe is accurately positioned inside the absorption tower along the horizontal direction. Therefore, such failures can be suppressed that attaching the spray pipe inside the absorption tower in a state, in which the spray nozzles are attached to the spray pipe, makes installation work difficult, and that the spray nozzle comes into contact with the opening portion and is broken. When attaching the spray nozzle to the spray pipe, the injection direction of the spray nozzle can be easily coincided with the vertical direction.

In the method for installing a spray pipe having the configuration described above, the method may further include an installing step of installing a foothold member on which a worker gets to work, on the upper end portion in the vertical direction of the pipe portion of the spray pipe before attaching the spray nozzle in the attachment step.

With this method, the worker, who gets on the plate-shaped member disposed at the same height as the upper end portion of the spray pipe, can easily attach the spray nozzle.

Advantageous Effect of Invention

According to the present invention, it is possible to provide a method for installing a spray pipe to accurately position a spray pipe along a horizontal direction, the method being capable of suppressing such a failure that a breakage is caused by a reaction force and an impactive force applied as a liquid absorbent is injected upward.

BRIEF DESCRIPTION OF DRAWINGS

FIG. 11 illustrates a plate-shaped member viewed along arrows V-VI in

FIG. 9.

DESCRIPTION OF EMBODIMENTS

Hereinafter, a desulfurization device 100 according to an embodiment of the present invention will be described with reference to the drawings.

Figure 1:
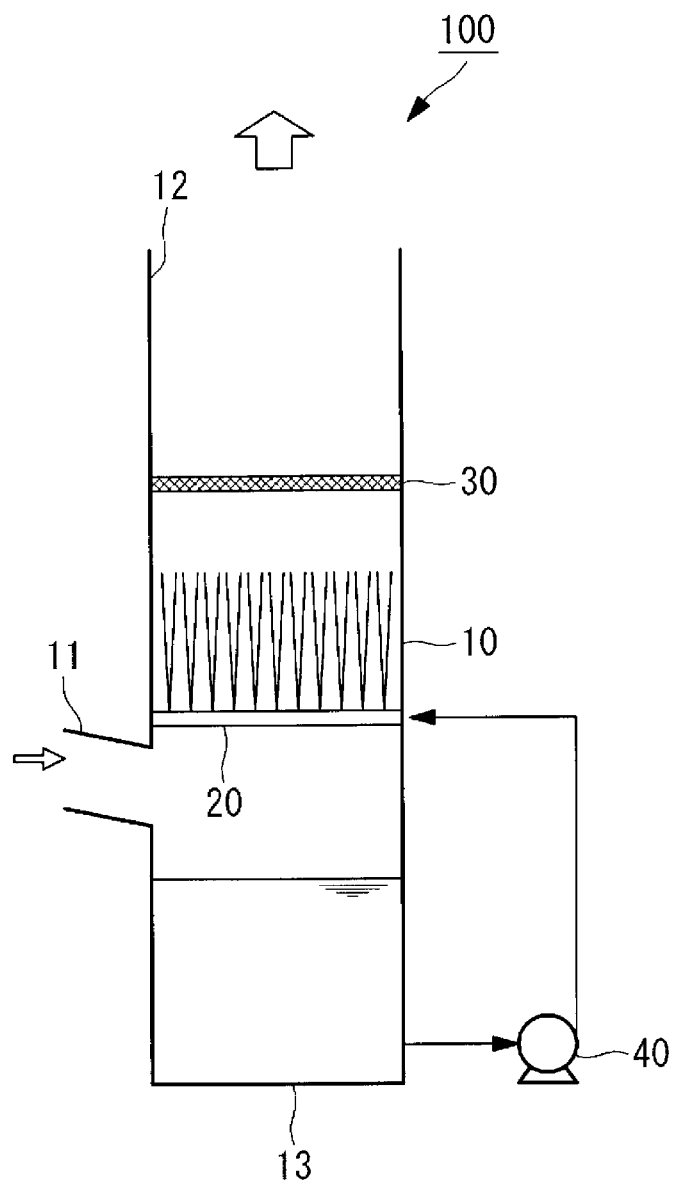
FIG. 1 is a vertical cross-sectional view illustrating a schematic configuration of a desulfurization device according to an embodiment of the present invention.

As illustrated in FIG. 1, the desulfurization device 100 of the present embodiment includes an absorption tower 10, a spray pipe 20, a demister 30, and a circulation pump 40.

The absorption tower 10 is a tubular casing that is formed to extend in a vertical direction and serves as a passage for exhaust gas. The absorption tower 10 directs the exhaust gas containing sulfur oxide introduced from an exhaust gas introduction section 11 formed on a side face, upward in the vertical direction. The absorption tower 10 discharges the exhaust gas from an exhaust gas discharge section 12 formed thereabove in the vertical direction.

The spray pipe 20 is a cylindrical member positioned inside the absorption tower 10 along the horizontal direction. As illustrated in FIG. 1, the spray pipe 20 injects a liquid absorbent upward in the vertical direction, and thereby brings the liquid absorbent into gas-liquid contact with the exhaust gas introduced from the exhaust gas introduction section 11. Here, the liquid absorbent is a liquid containing lime, and sulfur oxide contained in the exhaust gas is removed by a lime-gypsum method. The liquid absorbent injected from the spray pipe 20 accumulates in a bottom section 13 of the absorption tower 10. The liquid absorbent accumulated in the bottom section 13 is supplied to the spray pipe 20 by the circulation pump 40.

The demister 30 is, for example, a folded plate demister, and removes mist of the liquid absorbent generated inside the absorption tower 10 by physical collisions.

Next, a structure of the spray pipe 20 and the peripheral portion thereof included in the desulfurization device 100 of the present embodiment will be described in detail.

Figure 2:
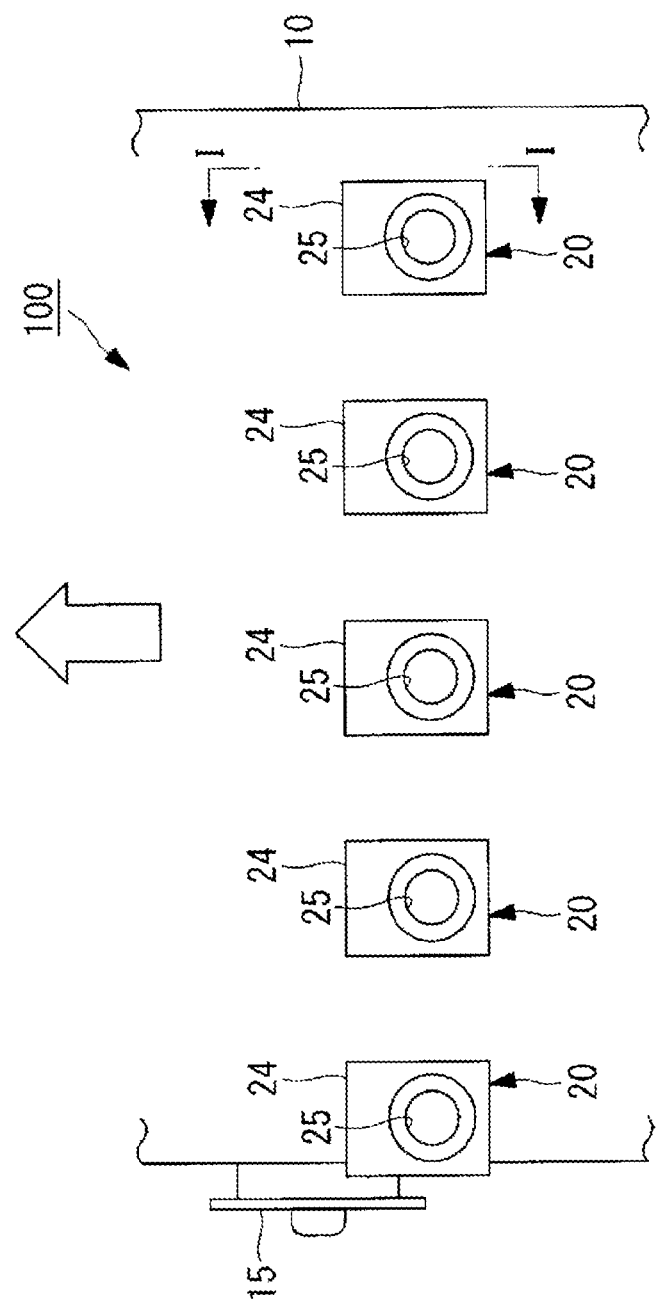
FIG. 2 is a side view of a portion including spray pipes of the desulfurization device illustrated in FIG. 1.

FIG. 2 is a side view of a potion including the spray pipes 20 of the desulfurization device 100 illustrated in FIG. 1.

As illustrated in FIG. 2, in the desulfurization device 100, a plurality of spray pipes 20 are inserted into the absorption tower 10 from the outside of the absorption tower 10. Five of the spray pipes 20 disposed at predetermined positions in the vertical direction are positioned in the desulfurization device 100 at equal intervals in the horizontal direction. Note that the number of the spray pipes 20 included in the desulfurization device 100 may be any number other than five depending on a size and the like of the absorption tower 10. A plurality of spray pipes 20 may be positioned in a plurality of rows at different positions in the vertical direction.

As illustrated in FIG. 2, the spray pipe 20 is provided with an attachment flange (attachment portion) 24 and a supply port 25. The attachment flange 24 is a member for attaching the spray pipe 20 to an opening portion 14 provided to the absorption tower 10. The attachment flange 24 is attached to the opening portion 14 (see FIG. 4) of the absorption tower 10 by a fastening portion (first fastening portion) 50 described later.

A manhole 15 for passing through a worker is provided on a side surface of the absorption tower 10. The manhole 15 can also be used in a case that a maintenance component or the like is carried from the outside to the inside of the absorption tower 10, or in a case that a used component or the like is carried from the inside to the outside of the absorption tower 10.

Figure 3:
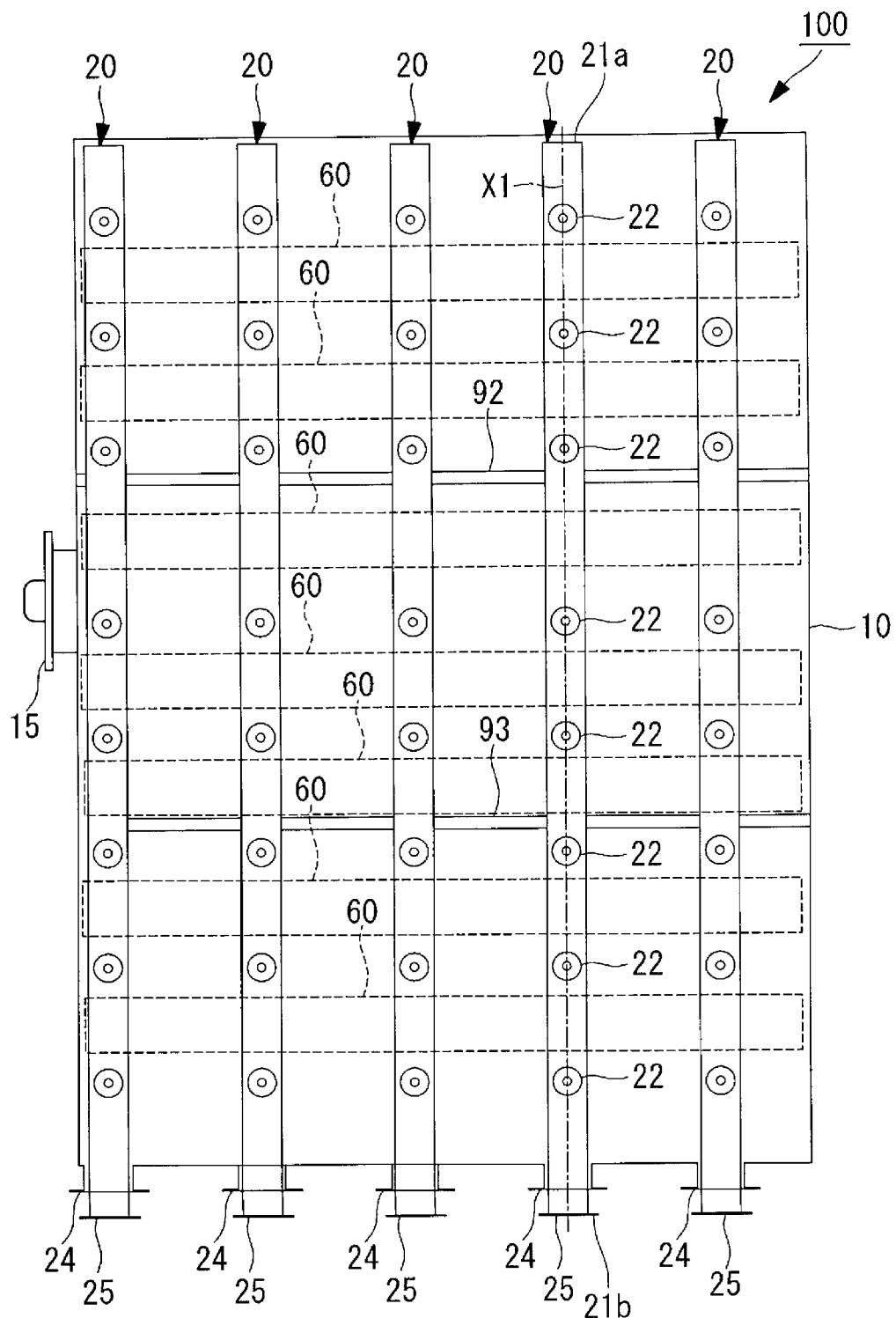
FIG. 3 is a plan view of the spray pipes illustrated in FIG. 2, viewed from above.
Figure 4:
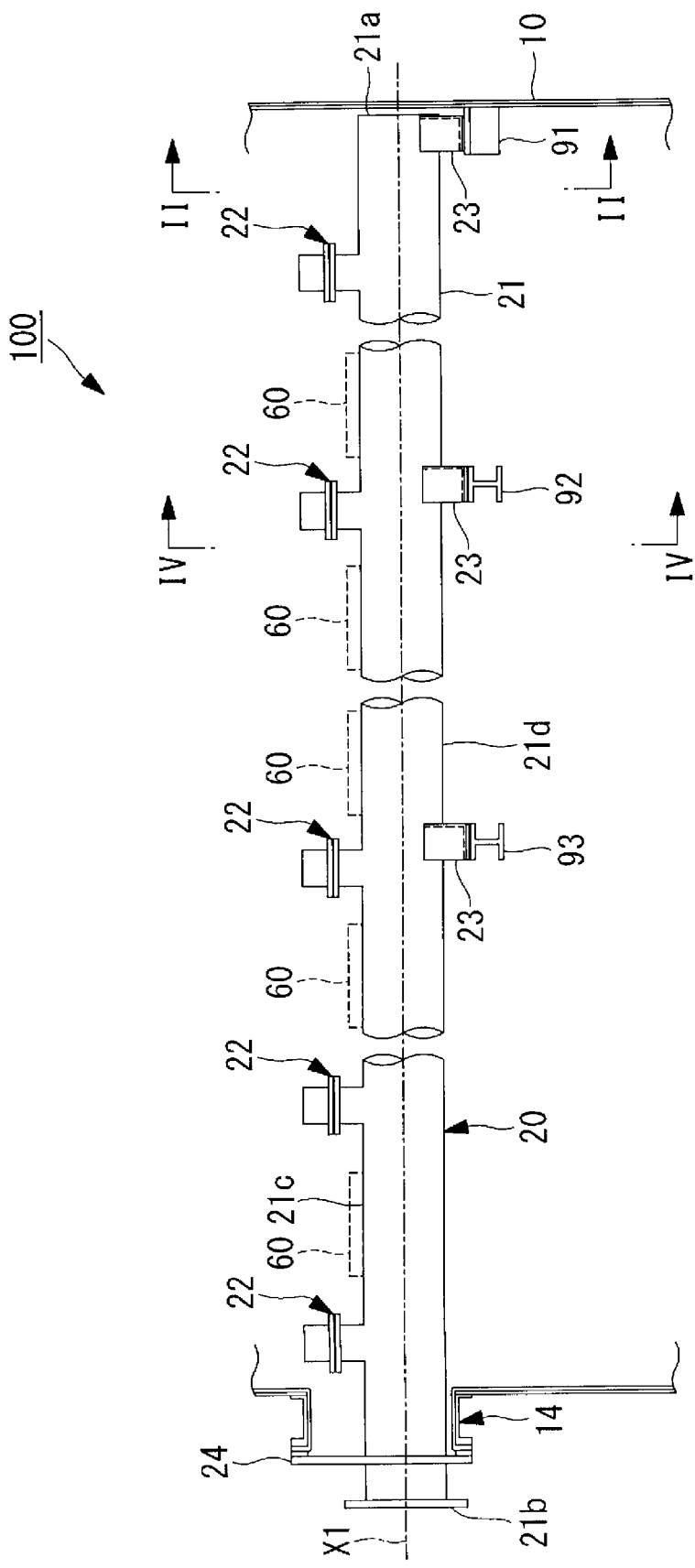
FIG. 4 illustrates a portion including the spray pipes of the desulfurization device viewed along arrows I-I in FIG. 2.

FIG. 3 is a plan view of five spray pipes 20 illustrated in FIG. 2, viewed from above. FIG. 4 illustrates a portion including the spray pipes 20 of the desulfurization device 100 viewed along arrows I-I in FIG. 2.

As illustrated in FIGS. 3 and 4, the spray pipe 20 includes a pipe portion 21, a plurality of nozzle portions 22, and a plurality of leg portions 23.

The pipe portion 21 is a cylindrical member extending linearly from a base end 21b to a leading end 21a along an axis line X1 in the horizontal direction, and the leading end 21a is closed. The base end 21b of the pipe portion 21 is provided with the supply port 25 to which the liquid absorbent is supplied from the circulation pump 40. Because the leading end 21a of the pipe portion 21 is closed, the liquid absorbent supplied through the supply port 25 to the inside of the pipe portion 21 is guided to the plurality of nozzle portions 22. A length from the base end 21b to the leading end 21a along the axis line X1 of the pipe portion 21 is 3 m or more and 15 m or less. An outer diameter of the pipe portion 21 is 200 mm or more and 400 mm or less.

Figure 5:
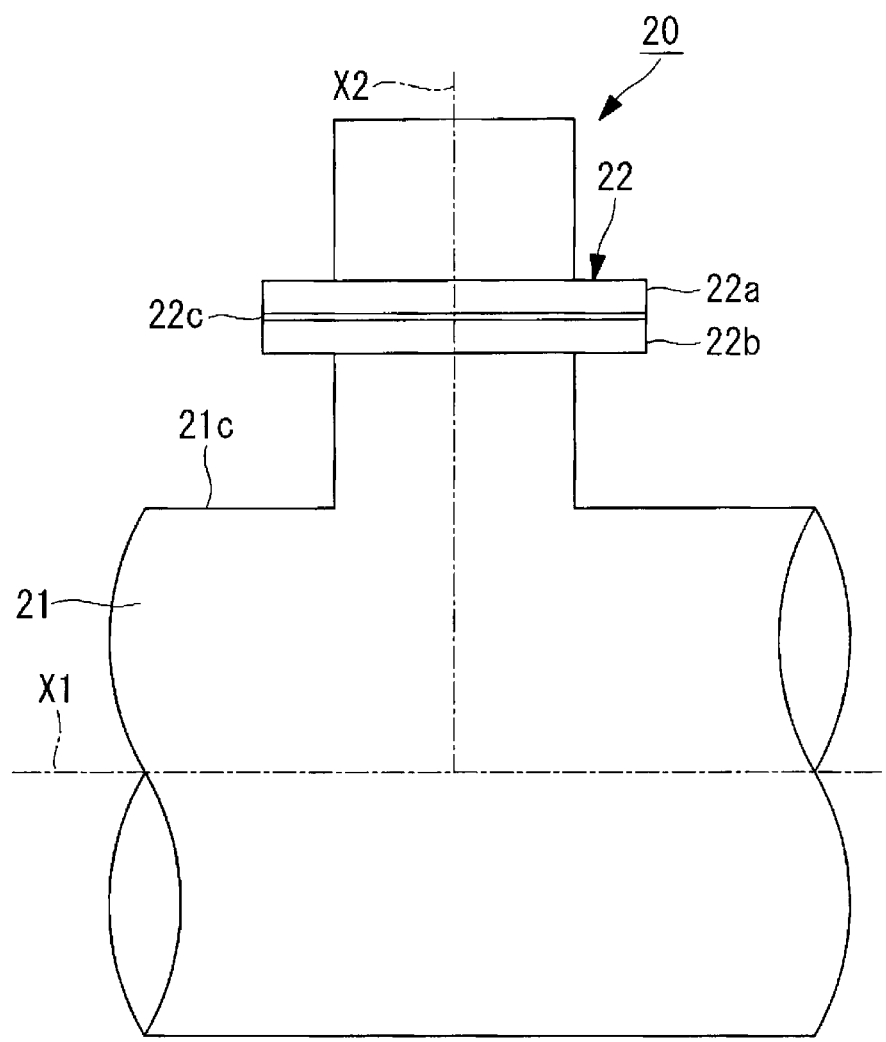
FIG. 5 is a partially enlarged view of a nozzle portion illustrated in FIG. 2.

A plurality of nozzle portions 22 are members disposed at a plurality of locations of an upper end portion 21c of the pipe portion 21 in the vertical direction, along the axis line X1 at equal intervals. Here, FIG. 5 is a partial enlarged view of the nozzle portion 22 illustrated in FIG. 2. As illustrated in FIG. 5, the nozzle portion 22 includes a spray nozzle 22a, a nozzle holder 22b, and a gasket 22c.

The spray nozzle 22a is a member that guides the liquid absorbent, the liquid absorbent flowing through the pipe portion 21 in the horizontal direction along the axis line X1, upward in the vertical direction along an axis line X2. The spray nozzle 22a injects the liquid absorbent supplied from the circulation pump 40 upward in the vertical direction to bring the exhaust gas into gas-liquid contact with the liquid absorbent within the absorption tower 10. The spray nozzle 22a is formed, for example, from silicon carbide (SiC).

The nozzle holder 22b is a member that is attached to the upper end portion 21c of the pipe portion 21 and is formed in a cylindrical shape along the axis line X2 in the vertical direction. As illustrated in FIG. 5, a flange is formed on an upper end of the nozzle holder 22b. A flange having the same shape as the flange of the nozzle holder 22b is formed on the spray nozzle 22a. As illustrated in FIG. 5, the flange of the spray nozzle 22a and the flange of the nozzle holder 22b in a state of sandwiching the circular gasket 22c (for example, made of butyl rubber) are fastened by a plurality of fasteners (not illustrated).

As illustrated in FIG. 4, a plurality of leg portions 23 are members disposed on a lower end portion 21d of the pipe portion 21. The leg portions 23 are disposed at a plurality of locations including the leading end 21a of the pipe portion 21. A plurality of leg portions 23 transmit a load of the pipe portion 21 to a pipe support (supporting portion) 91, a support beam (supporting portion) 92, and a support beam (supporting portion) 93 that are installed in the absorption tower 10. The pipe support 91, the support beam 92, and the support beam 93 are members that are installed in the absorption tower 10 to support the spray pipe 20. A reaction force when injecting the liquid absorbent and an impactive force caused by the liquid absorbent dropping and coming into contact with the pipe portion 21, which forces are applied to the pipe portion 21, are transmitted to the absorption tower 10 via a plurality of leg portions 23.

Here, the leg portion 23 disposed at the leading end 21a of the pipe portion 21 will be described.

Figure 6:
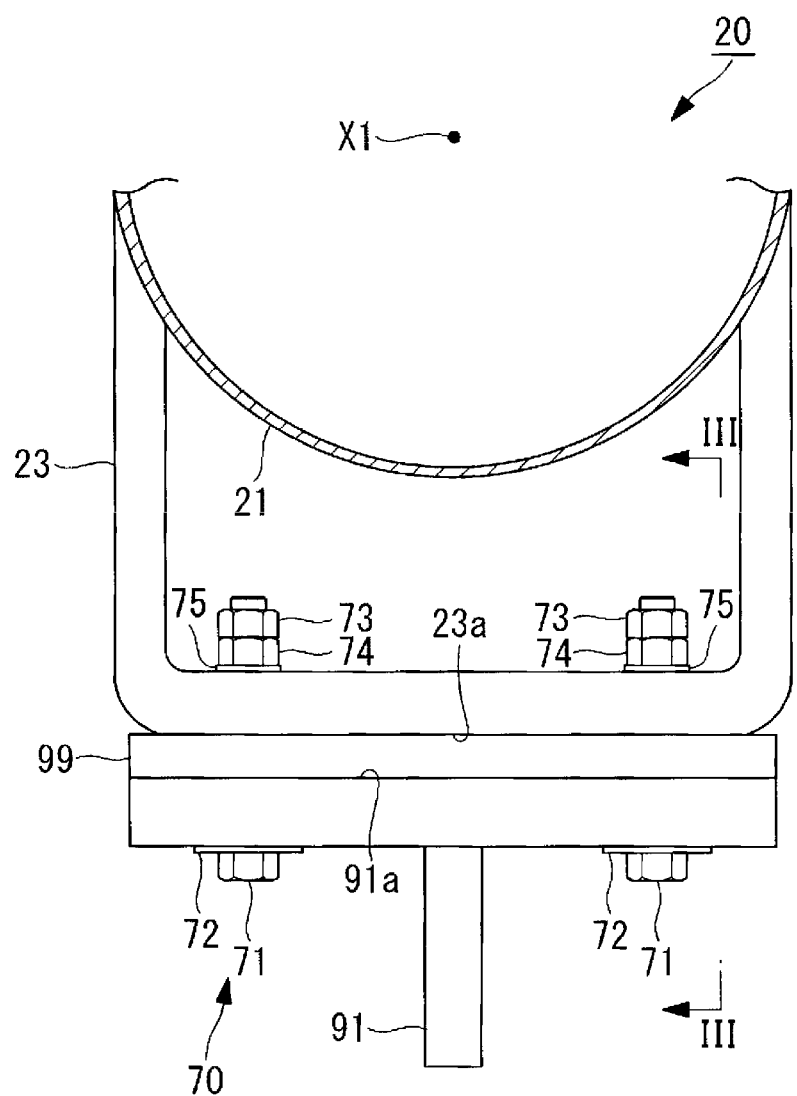
FIG. 6 illustrates a portion including the spray pipe of the desulfurization device viewed along arrows II-II in FIG. 4.
Figure 7:
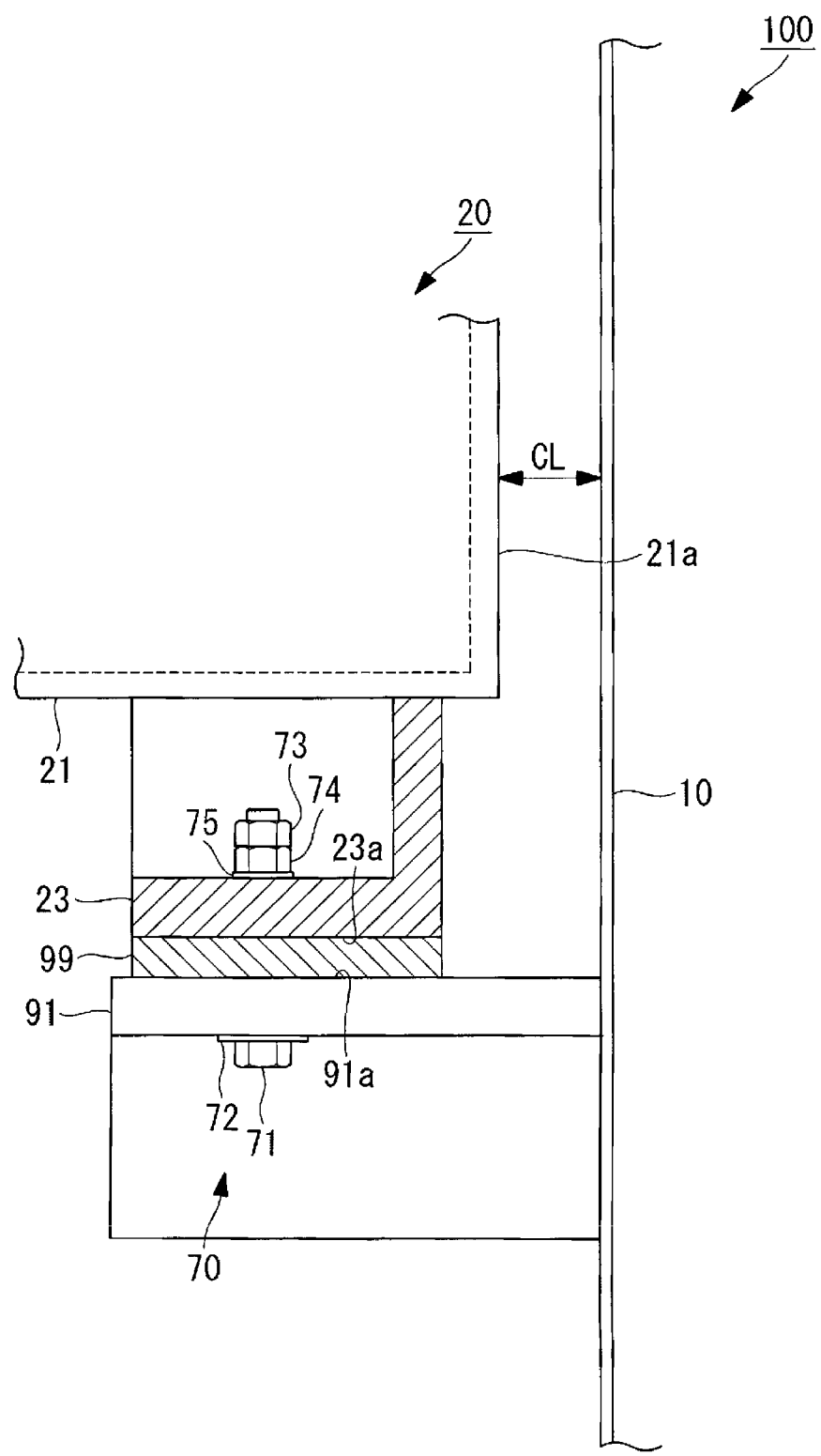
FIG. 7 illustrates a portion including the spray pipe of the desulfurization device viewed along arrows in FIG. 6.

FIG. 6 illustrates a portion including the spray pipe 20 of the desulfurization device 100 viewed along arrows II-II in FIG. 4. FIG. 7 illustrates a portion including the spray pipe 20 of the desulfurization device 100 viewed along arrows in FIG. 6. The leg portion 23 illustrated in FIGS. 6 and 7 is attached to the lower end portion 21d at the leading end 21a of the pipe portion 21. As illustrated in FIG. 6, an upper end of the leg portion 23 is attached to the pipe portion 21. The leg portion 23 includes an installation surface (first surface) 23a at a lower end thereof. The installation surface 23a is a flat installation surface along a horizontal plane, but may be another aspect. For example, the installation surface 23a may have a polygonal shape or an arc shape in a cross section orthogonal to the axis line X1.

As illustrated in FIG. 7, the pipe support 91 formed of a metal material or the like is installed on an inner wall surface of the absorption tower 10. The pipe support 91 includes a supporting surface (second surface) 91a on an upper end thereof. The supporting surface 91a is a flat installation surface along a horizontal plane, but may be another aspect. For example, the supporting surface 91a may have a polygonal shape or an arc shape in a cross section orthogonal to the axis line X1. The upper surface of the supporting surface 91a may be coated with a resin lining to protect the supporting surface 91a from corrosion or the like.

As illustrated in FIGS. 6 and 7, a shim plate (shim plate; plate-shaped member) 99 is disposed between the installation surface 23a of the lower end of the leg portion 23 and the supporting surface 91a of the upper end of the pipe support 91.

As illustrated in FIGS. 6 and 7, the leg portion 23 is disposed in a state in which the installation surface 23a faces the supporting surface 91a.

Note that the shim plate 99 is a member that adjusts a position of the installation surface 23a in the vertical direction with respect to the supporting surface 91a in order to install the pipe portion 21 along the horizontal direction. In FIGS. 6 and 7, although the shim plate 99 is disposed between the installation surface 23a and the supporting surface 91a, the shim plate 99 may not be disposed if the shim plate 99 is not needed for installing the pipe portion 21 along the horizontal direction. In this case, the installation surface 23a and the supporting surface 91a are disposed in a state where these surfaces are in direct contact with each other. The shim plate 99 having a thickness appropriate in the vertical direction may be used to install the pipe portion 21 along the horizontal direction. A plurality of shim plates 99 may be disposed in a stacked manner.

As illustrated in FIGS. 6 and 7, the leg portion 23, the pipe support 91, and the shim plate 99 are fastened by a fastening portion (second fastening portion) 70. The fastening portion 70 includes a fastening bolt 71 having a head and a shaft portion, a washer 72 disposed between the head of the fastening bolt 71 and the pipe support 91, fastening nuts 73 and 74 fastened on the shaft portion of the fastening bolt 71, and a washer 75 disposed between the fastening nut 74 and the leg portion 23.

Fastening two fastening nuts 73 and 74 on the shaft portion of the fastening bolt 71 is to allow a clearance gap to be provided below the fastening nut 74. In a case that a clearance gap is not provided below the fastening nut 74, the leg portion 23, the pipe support 91, and the shim plate 99 are advantageously rigidly connected. On the other hand, if the leg portion 23, the pipe support 91, and the shim plate 99 are rigidly connected, deformation and breakage may occur in a fastened portion when the pipe portion 21 deforms due to thermal expansion. In the present embodiment, the fastening nut 73 and the fastening nut 74 can be in a fastening state in which the fastening nut 73 and the fastening nut 74 do not move in the vertical direction, by tightening the fastening nut 73 in a state in which a clearance gap is provided below the fastening nut 74, or by tightening the fastening nut 74 and thereafter tightening the fastening nut 73, and further loosening fastening nut 74. In this case, even in the case that the pipe portion 21 deforms due to thermal expansion, failures caused by the deformation and breakage occurring in the fastened portion can be suppressed.

Next, the leg portion 23 disposed at an intermediate portion between the leading end 21a and the base end 21b of the pipe portion 21 will be described.

Figure 8:
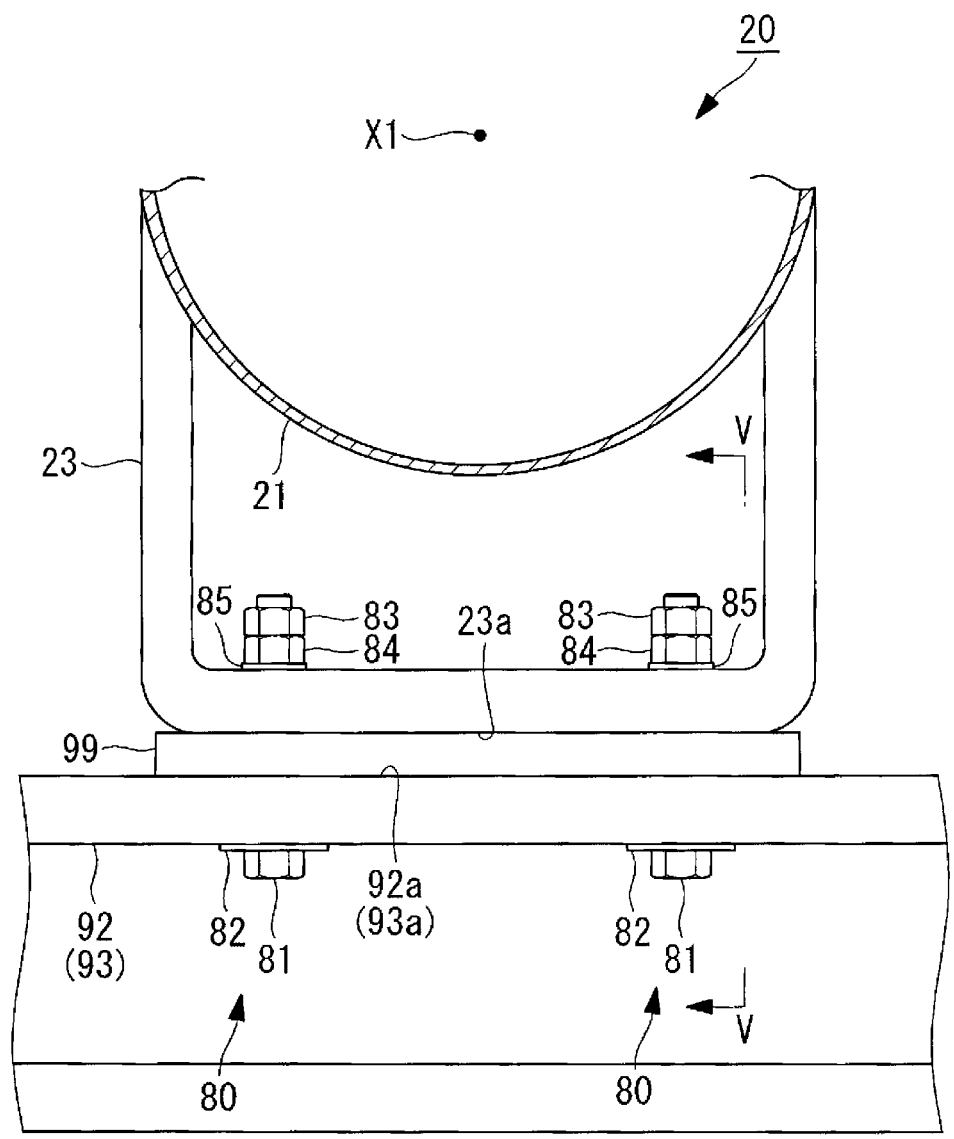
FIG. 8 illustrates a portion including the spray pipe of the desulfurization device viewed along arrows IV-IV in FIG. 4.
Figure 9:
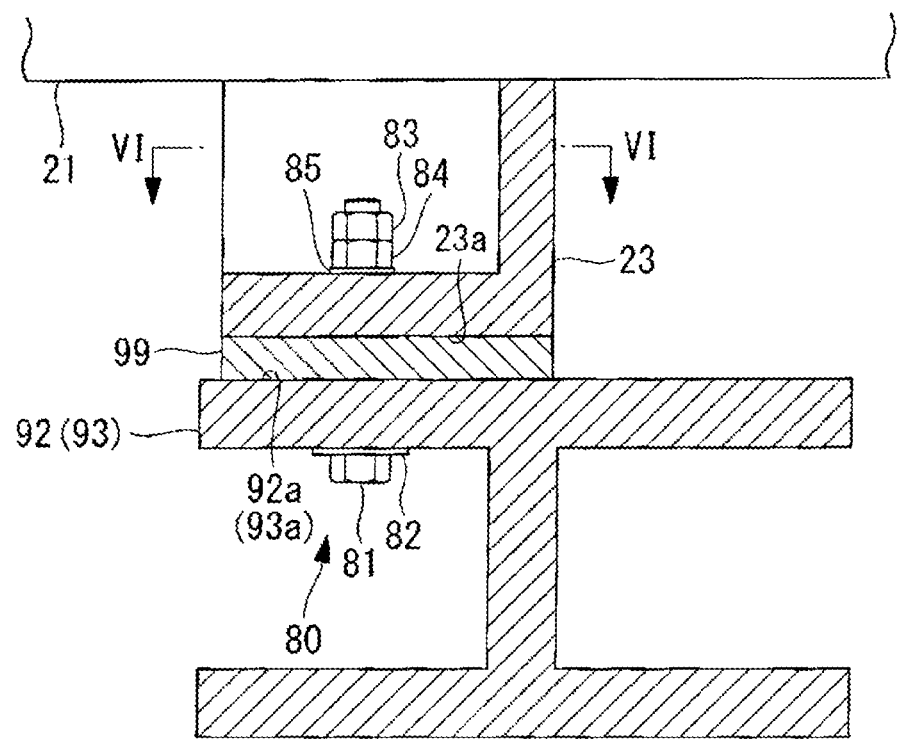
FIG. 9 illustrates a portion including the spray pipe of the desulfurization device viewed along arrows V-V in FIG. 8.

FIG. 8 illustrates a portion including the spray pipe 20 of the desulfurization device 100 viewed along arrows IV-IV in FIG. 4. FIG. 9 illustrates a portion including the spray pipe 20 of the desulfurization device 100 viewed along arrows V-V in FIG. 8. The leg portion 23 illustrated in FIGS. 8 and 9 is attached to the intermediate portion between the leading end 21a and the base end 21b of the pipe portion 21. As illustrated in FIG. 8, an upper end of the leg portion 23 is attached to the pipe portion 21. The leg portion 23 includes an installation surface (first surface) 23a at a lower end thereof. The installation surface 23a is a flat installation surface along a horizontal plane, but may be another aspect. For example, the installation surface 23a may have a polygonal shape or an arc shape in a cross section orthogonal to the axis line X1.

As illustrated in FIG. 3 and FIG. 8, a support beam 92 and a support beam 93 that are formed of a metal material or the like and extend in the horizontal direction are installed in the absorption tower 10. The support beam 92 includes a supporting surface (second surface) 92a on an upper end thereof. Similarly, the support beam 93 has a supporting surface (second surface) 93a at an upper end thereof.

Each of the supporting surfaces 92a and 93a is a flat installation surface along a horizontal plane, but may be another aspect. For example, each of the supporting surface 92a and the supporting surface 93a may have a polygonal shape or an arc shape in a cross section orthogonal to the axis line X1. The upper surface of each of the supporting surface 92a and the supporting surface 93a may be coated with a resin lining to protect the supporting surface 92a and the supporting surface 93a, respectively, from corrosion or the like.

As illustrated in FIGS. 8 and 9, the shim plate 99 is disposed between the installation surface 23a of the lower end of the leg portion 23 and the supporting surface 92a of the upper end of the support beam 92 or the supporting surface 93a of the upper end of the support beam 93.

As illustrated in FIGS. 8 and 9, the leg portion 23 is disposed in a state in which the installation surface 23a faces the supporting surfaces 92a and 93a.

Note that the shim plate 99 is a member that adjusts a position of the installation surface 23a in the vertical direction with respect to each of the supporting surfaces 92a and 93a in order to install the pipe portion 21 along the horizontal direction. In FIGS. 8 and 9, although the shim plate 99 is disposed between the installation surface 23a and the supporting surface 92a or 93a, the shim plate 99 may not be disposed if the shim plate 99 is not needed for installing the pipe portion 21 along the horizontal direction. In this case, the installation surface 23a and the supporting surfaces 92a and 93a are disposed in a state where these surfaces are in direct contact with one another. The shim plate 99 having a thickness appropriate in the vertical direction may be used to install the pipe portion 21 along the horizontal direction. A plurality of shim plates 99 may be disposed in a stacked manner.

As illustrated in FIGS. 8 and 9, the leg portion 23, the support beams 92 and 93, and the shim plate 99 are fastened by a fastening portion (second fastening portion) 80. The fastening portion 80 includes a fastening bolt 81 including a head and a shaft portion, a washer 82 disposed between the head of the fastening bolt 81 and the support beams 92 and 93, fastening nuts 83 and 84 fastened on the shaft portion of the fastening bolt 81, and a washer 85 disposed between the fastening nut 84 and the leg portion 23. Note that fastening two fastening nuts 83 and 84 on the shaft portion of the fastening bolt 81 is to allow a clearance gap to be provided below the fastening nut 84.

Here, a method of manufacturing the spray pipe 20 will be described. The spray pipe 20 of the present embodiment is formed by integrally molding the pipe portion 21, the nozzle holders 22b of the nozzle portions 22, and the leg portions 23 by a fiber-reinforced plastic. On the other hand, the spray nozzle 22a attached to the nozzle holder 22b is formed of silicon carbide (SiC), for example.

The spray pipe 20 of the present embodiment is manufactured by integrally molding the pipe portion 21, the nozzle holders 22b of the nozzle portions 22, and the leg portions 23 by the fiber-reinforced plastic, and then attaching the spray nozzles 22a to the nozzle holders 22b. The spray pipe 20 is likely to experience wear, such as due to impingement of the liquid absorbent injected upward. In the present embodiment, since the fiber-reinforced plastic is used for the spray pipe 20, resistance to wear is high. Furthermore, resistance to corrosion is also high.

Note that a metal material (for example, UNS S31254 or Hastelloy C-276) in place of the fiber-reinforced plastic may be used as the material for forming the spray pipe 20. In a case of a desulfurization device for an oil burning boiler, 316L or the like may be used.

Next, an insertion hole 23b formed in the leg portion 23 will be described.

Figure 10:
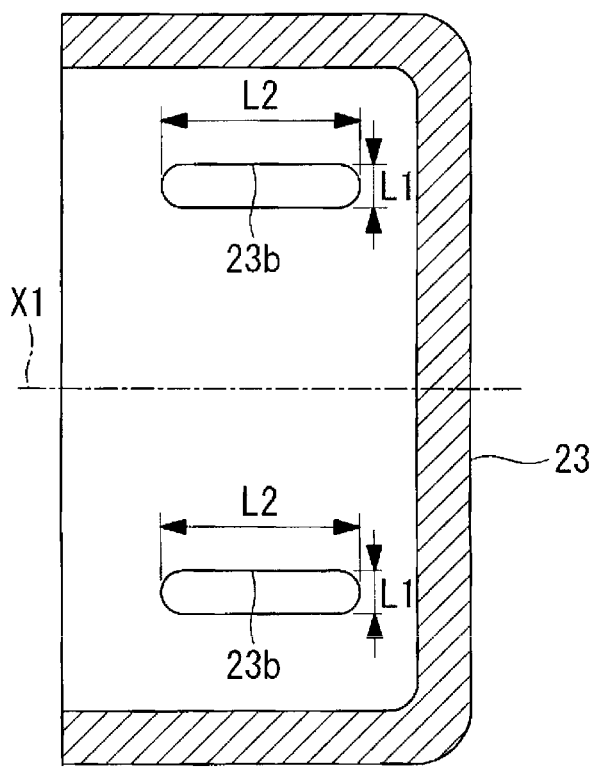
FIG. 10 is a cross-sectional view of a leg portion viewed along arrows VI-VI in FIG. 9.

FIG. 10 is a cross-sectional view of the leg portion 23 viewed along arrows VI-VI in FIG. 9. As illustrated in FIG. 10, the insertion hole 23b into which the fastening bolt 81 is inserted is formed in the installation surface 23a of the leg portion 23. The insertion hole 23b has a length L2 in a direction along the axis line X1 that is longer than a length L1 in a direction orthogonal to the axis line X1. The insertion hole 23b is a long hole in order to suppress failures that the insertion hole 23b contacts the fastening bolt 81 when the leg portion 23 moves toward the leading end 21a of the pipe portion 21 by the spray pipe 20 thermally stretching.

Note that in the present embodiment, the insertion hole 23b provided on the installation surface 23a of the leg portion 23 is a long hole, and the insertion hole (not illustrated) provided to the pipe support 91 and the support beams 92 and 93 is a circular round hole, but other aspects may be used. For example, the insertion hole 23b provided on the installation surface 23a of the leg portion 23 may be a circular round hole, and the insertion hole (not illustrated) provided to the pipe support 91 and the support beams 92 and 93 may be a long hole having a length L2 in a direction along the axis line X1 that is longer than a length L1 in a direction orthogonal to the axis line X1. Alternatively, both the insertion hole 23b provided on the installation surface 23a of the leg portion 23 and the insertion hole provided to the pipe support 91 and the support beams 92 and 93 may be a long hole.

Next, a cutout 99a formed on the shim plate 99 will be described.

Figure 11:
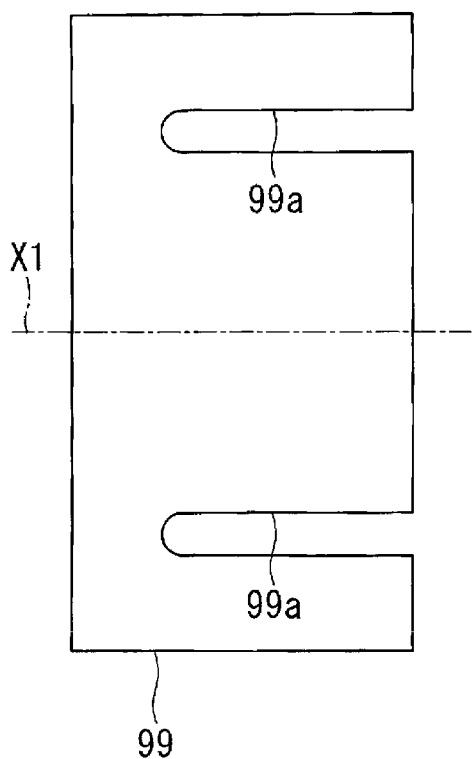

FIG. 11 illustrates a plate-shaped member viewed along arrows VI-VI in FIG. 9. As illustrated in FIG. 11, the cutout 99a that opens toward one end is formed on the shim plate 99. The cutout 99a is a portion into which the fastening bolt 81 can be inserted in a state in which the cutout 99a is between the installation surface 23a of the leg portion 23 and the supporting surfaces 92a and 93a of the support beams 92 and 93. The cutout 99a is a portion into which the fastening bolt 71 can be inserted in a state in which the cutout 99a is between the installation surface 23a of the leg portion 23 and the supporting surface 91a of the pipe support 91 (see FIG. 7).

Since the shim plate 99 includes the cutout 99a, the shim plate 99 can be inserted between the installation surface 23a of the leg portion 23 and the supporting surface 91a of the pipe support 91 without removing the fastening bolt 71. Similarly, since the shim plate 99 includes the cutout 99a, the shim plate 99 can be inserted between the installation surface 23a of the leg portion 23 and the supporting surfaces 92a and 93a of the support beams 92 and 93 without removing the fastening bolt 81. In this manner, when installing the leg portion 23 provided to the spray pipe 20 into the pipe support 91 and the support beams 92 and 93, the shim plate 99 is installed at a suitable location so that the spray pipe 20 can be adjusted to be positioned in the horizontal direction.

Note that the shim plate 99 is disposed in a state of being open toward the leading end 21a of the pipe portion 21 along the axis line X1. Specifically, the cutout 99a of the shim plate 99 is not open toward the base end 21b side of the pipe portion 21. Thus, even when a force directed to the leading end 21a is applied to the shim plate 99 from the leg portion 23, the shim plate 99 which is brought into contact with the fastening bolts 71 and 81 does not move toward the leading end 21a. Therefore, failures that the shim plate 99 moves toward the leading end 21a to drop out of the pipe support 91 and the support beams 92 and 93 can be prevented.

Next, a clearance gap CL formed between the leading end 21a of the pipe portion 21 of the spray pipe 20 and the inner wall surface of the absorption tower 10 will be described.

As illustrated in FIG. 7, a clearance gap CL is defined between the leading end 21a of the pipe portion 21 and the inner wall surface of the absorption tower 10. This clearance gap CL is an interval required for the leading end 21a of the pipe portion 21 to not contact the inner wall surface of the absorption tower 10. Note that the spray pipe 20 is thermally expanded by high-temperature exhaust gas. Therefore, the pipe portion 21 of the present embodiment is arranged so that the clearance gap CL can be ensured even in a state in which the spray pipe 20 is heated by the exhaust gas. In other words, the pipe portion 21 is installed in a state in which the spray pipe 20 is installed (the same state as at the atmospheric temperature) so that the clearance gap CL can be ensured even when thermal stretching occurs. In the present embodiment, in a state of not being heated by the exhaust gas, the clearance gap CL between the leading end 21a of the pipe portion 21 and the inner wall surface of the absorption tower 10 is 10 mm or more and 100 mm or less.

Next, a structure in which the attachment flange 24 of the spray pipe 20 is attached to the opening portion 14 of the absorption tower 10 will be described.

Figure 12:
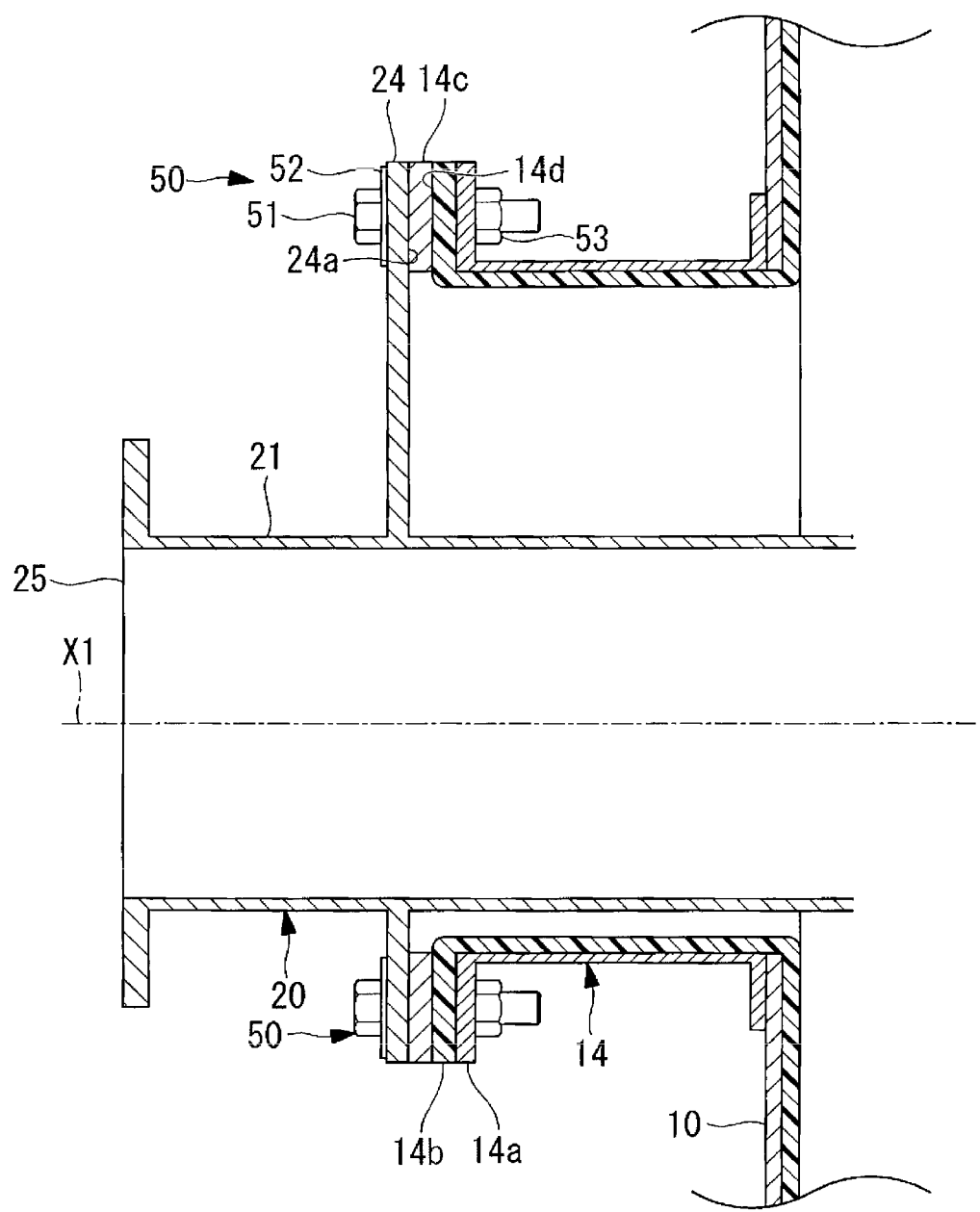
FIG. 12 is a partial enlarged view of a portion including an attachment flange of the spray pipe in the desulfurization device illustrated in FIG. 4.

FIG. 12 is a partial enlarged view of a portion including the attachment flange 24 of the spray pipe 20 in the desulfurization device 100 illustrated in FIG. 4. As illustrated in FIG. 12, the opening portion 14 of the absorption tower 10 is formed in a cylindrical shape to be open toward the side of the absorption tower 10 and extend along the axis line X1. A flange 14a is formed at an end of the opening portion 14. A lining portion 14b made of resin for protecting the flange 14a from corrosion due to exhaust gas or the like is provided on an inner circumferential surface of the flange 14a.

As illustrated in FIG. 12, the attachment flange 24 of the spray pipe 20 protrudes from an outer circumferential surface of the pipe portion 21 and has an attachment surface (first attachment surface) 24a along the vertical direction. On the other hand, the flange 14a of the opening portion 14 includes an attachment surface (second attachment surface) 14d along the vertical direction. The attachment surface 24a and the attachment surface 14d are disposed in a state where these surfaces face each other with the gasket 14c interposed therebetween.

The attachment flange 24 of the spray pipe 20 is attached to the flange 14a of the opening portion 14 by the fastening portion (first fastening portion) 50 in a state where the gasket 14c (for example, made of butyl rubber) is interposed therebetween. As illustrated in FIG. 12, the fastening portion 50 includes a fastening bolt 51 including a head and a shaft portion, a washer 52 disposed between the head of the fastening bolt 51 and the attachment flange 24, and a fastening nut 53 fastened on the shaft portion of the fastening bolt 51. In FIG. 12, the fastening portions 50 are illustrated in only two locations above and below in the vertical direction, but the fastening portions 50 are provided at a plurality of locations so as to surround an outer peripheral edge of the attachment flange 24.

Here, in a case that an end face of the opening portion 14 is inclined from the vertical direction, the spray pipe 20 attached to the opening portion 14 is inclined from the horizontal direction. Therefore, a thickness of the attachment flange 24 of the lining portion 14b and an interposed portion is appropriately adjusted so that the end face of the opening portion 14 coincides with the vertical direction. A sealing material may be applied between the attachment flange 24 and the gasket 14c so that the end face of the opening portion 14 coincides with the vertical direction. Note that the application of the sealing material may be performed instead of adjusting the thickness of the lining portion 14b, or may be performed in addition to adjusting the thickness of the lining portion 14b.

Figure 13:
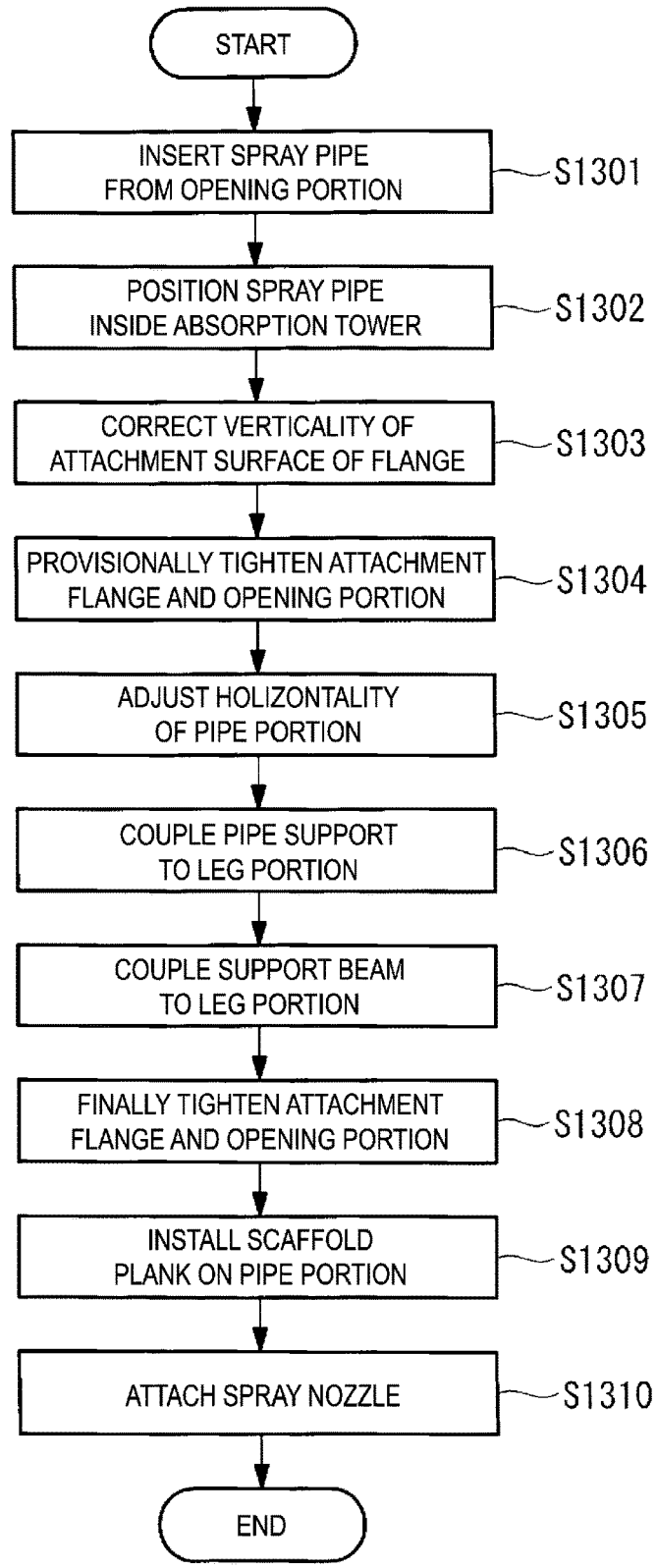
FIG. 13 is a flowchart illustrating a method for installing a spray pipe inside an absorption tower.

Next, a method for installing the spray pipe 20 inside the absorption tower 10 will be described. FIG. 13 is a flowchart illustrating the method for installing the spray pipe 20 inside the absorption tower 10. Each of the processes illustrated in FIG. 13 is a process performed by a worker or a working device such a crane operated by the worker.

Figure 14:
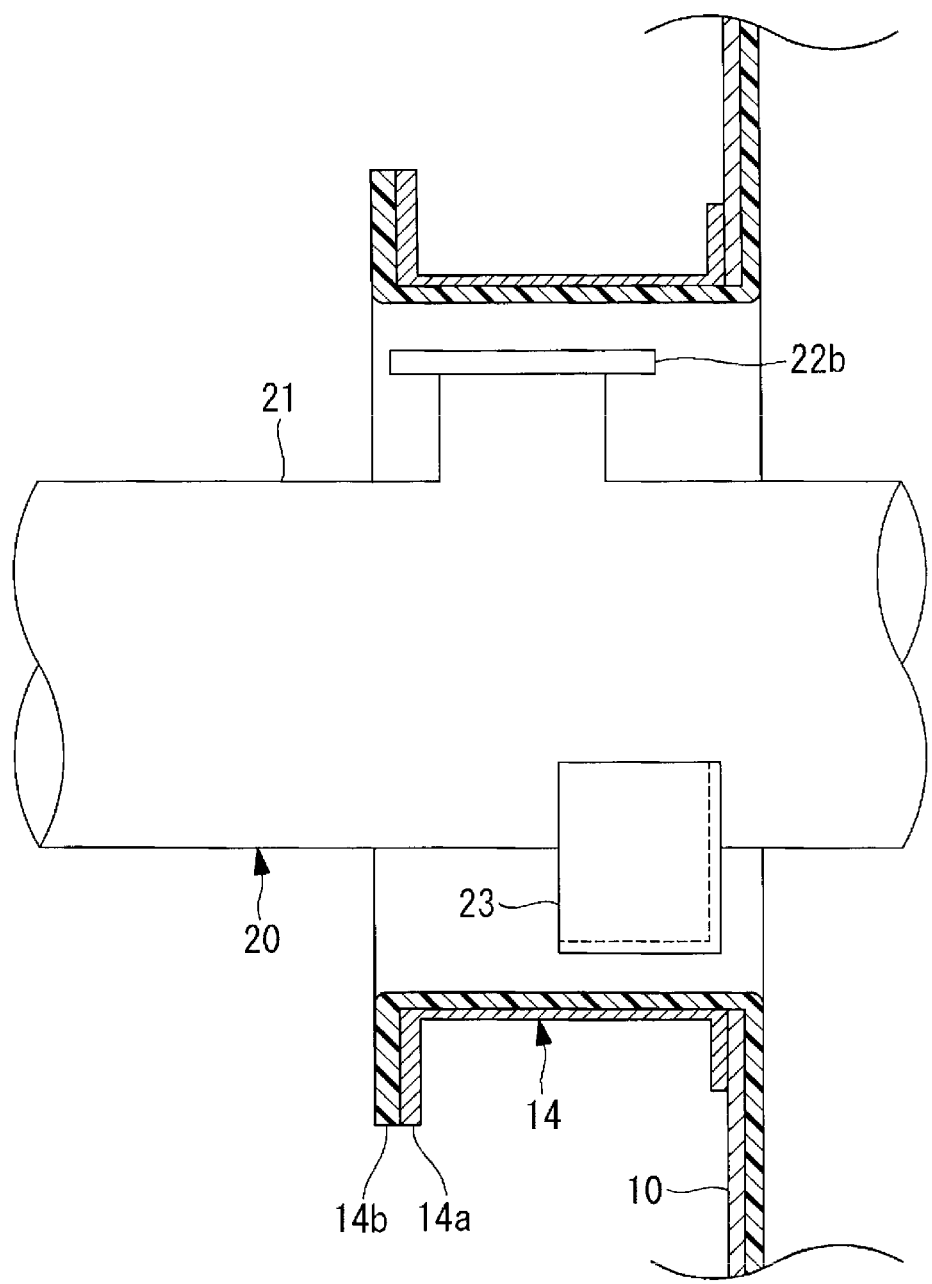
FIG. 14 is a partial enlarged view illustrating a step of inserting the spray pipe through an opening portion.

In step S1301 (insertion step), the worker lifts the spray pipe 20 placed outside the absorption tower 10 by a crane (not illustrated), and inserts the spray pipe 20 into the opening portion 14 of the absorption tower 10 in the horizontal direction. The worker adjusts a position of the pipe portion 21 with a guide rope (not illustrated) associated with the pipe portion 21 so that the spray pipe 20 does not contact the absorption tower 10. As illustrated in FIG. 14, the spray pipe 20 is inserted into the opening portion 14 of the absorption tower 10 in a state in which the spray nozzle 22a is not attached to the nozzle holder 22b.

In step S1302 (positioning step), the worker positions the spray pipe 20 inserted into the absorption tower 10 from the opening portion 14, inside the absorption tower 10 so as to be supported by the plurality of leg portions 23. As illustrated in FIG. 2, the worker positions the spray pipe 20 such that a state is established in which the installation surfaces 23a of a plurality of leg portions 23 face the supporting surface 91a of the pipe support 91, and the supporting surfaces 92a and 93a of the support beams 92 and 93, respectively.

In step S1303 (correction step), the worker corrects a verticality of the attachment surface 14d so that the attachment surface 14d of the flange 14a of the opening portion 14 is disposed along the vertical direction. The correction of the verticality of the attachment surface 14d is performed, for example, by adjusting the thickness of the lining portion 14b. Furthermore, the verticality of the attachment surface 14d may be corrected by disposing the gasket 14c or by adjusting a thickness of a sealant agent (for example, made of silicone) that is applied for the attachment surface 24a.

In step S1304 (provisionally tightening step), the worker provisionally tightens the attachment flange 24 of the spray pipe 20 and the opening portion 14 of the absorption tower 10 using the fastening portion 50. As illustrated in FIG. 12, the attachment flange 24 and the opening portion 14 are coupled by provisionally tightening the fastening portions 50 at a plurality of locations in a state in which the attachment surface 24a and the attachment surface 14d face each other with the gasket 14c interposed therebetween.

Here, "provisional tightening" refers to fastening the fastening bolt 51 and the fastening nut 53 with a torque of 30% or more and 70% or less assuming that a torque (Nm) when fastening the fastening portion 50 in final tightening described later as 100%.

In step S1305 (adjusting step), the worker adjusts a horizontality of the pipe portion 21 so that the axis line X1 along which the pipe portion 21 extends coincides with the horizontal plane in a state in which the attachment flange 24 and the opening portion 14 are provisionally tightened. Note that the horizontal plane referred to here includes a plane at an angle within a desired tolerance range from the horizontal plane (the same applies hereinafter). Specifically, the worker appropriately selects the thickness of the shim plate 99 inserted between the pipe support 91 and the leg portion 23, the thickness of the shim 99 inserted between the support beam 92 and the leg portion 23, and the thickness of the shim plate 99 inserted between the support beam 93 and the leg portion 23 to adjust the height of the installation surface 23a relative to the supporting surfaces 91a, 92a, and 93a. The worker, for example, puts a horizontal level device (not illustrated) on an upper surface of the nozzle holder 22b of the spray pipe 20, and visually checks the horizontal level device to determine whether or not the axis line X1 along which the pipe portion 21 coincides with the horizontal plane. In a case that the worker confirms that the horizontality indicated by the horizontal level device is within the desired tolerance range, the worker ends adjusting the horizontality.

After adjusting the verticality of the pipe portion 21 in step S1305 (adjusting step), the worker couples the pipe support 91 to the leg portion 23 disposed near the leading end 21a of the spray pipe 20 with the fastening portion 70 in step S1306 (coupling step). Specifically, the worker inserts the shaft portion of the fastening bolt 71 from below the pipe support 91 and fastens the fastening nuts 73 and 74 on the shaft portion penetrating through the leg portion 23 to couple the pipe support 91 to the leg portion 23. Note that the pipe support 91 and the leg portion 23 may be provisionally tightened in the coupling step of step S1306 so that a gap between the attachment flange 24 and the opening portion 14 can be finely adjusted in step S1308 (final tightening step) to be carried out later.

Furthermore, as described above, a clearance gap is desirably provided below the fastening nut 74 to suppress the deformation and breakage when the pipe portion 21 is thermally expanded. In a case that a clearance gap is provided below the fastening nut 74, a pair of fastening nuts 73 and 74 are tightened to be adjacent to each other so that the pair of fastening nuts 73 and 74 are not detached. In this manner, in step S1306, even in the case that the pipe portion 21 is thermally stretched, the pipe support 91 is coupled to the leg portion 23 in a state in which the leg portion 23 is movable along the axis line X1.

In step S1307 (coupling step), the worker couples the support beams 92 and 93 to the leg portions 23 with the fastening portions 80. Specifically, the worker inserts the shaft portions of the fastening bolts 81 from below the support beams 92 and 93 and fastens the fastening nuts 83 and 84 on the shaft portions penetrating through the leg portions 23 to couple the support beams 92 and 93 to the leg portions 23. Note that the support beams 92 and 93 and the leg portions 23 may be provisionally tightened in the coupling step of step S1307 so that a gap between the attachment flange 24 and the opening portion 14 can be finely adjusted in step S1308 (final tightening step) to be carried out later.

Furthermore, as described above, a clearance gap is desirably provided below the fastening nut 84 to suppress the deformation and breakage when the pipe portion 21 is thermally expanded. In a case that a clearance gap is provided below the fastening nut 84, a pair of fastening nuts 83 and 84 are tightened to be adjacent to each other so that a state is established in which the pair of fastening nuts 83 and 84 are not detached. In this manner, in step S1307, even in the case that the pipe portion 21 is thermally stretched, the support beams 92 and 93 are coupled to the leg portions 23 in a state in which the leg portions 23 are movable along axis line X1.

Here, the coupling between the support beam 92 and the leg portion 23 is performed prior to the coupling between the support beam 93 and the leg portion 23. The coupling step of step S1307 is performed in an order from the leading end 21a of the pipe portion 21 toward the base end 21b.

In step S1308 (final tightening step), the worker checks the clearance gap between the attachment flange 24 of the spray pipe 20 and the opening portion 14 of the absorption tower 10 to confirm that there is no excessive gap. If a gap exists, the position of the spray pipe 20 is finely adjusted to eliminate the gap. After that, the attachment flange 24 and the opening portion 14 are finally tightened using the fastening portion 50. As illustrated in FIG. 12, the attachment flange 24 and the opening portion 14 are coupled by finally tightening the fastening portions 50 at a plurality of locations in a state in which the attachment surface 24a and the attachment surface 14d face each other with the gasket 14c interposed therebetween. Here, "finally tightening" refers to fastening the fastening portion 50 provisionally tightened in step S1304 with an increased torque (Nm).

Note that, in step S1301 to step S1308 described above, a method for installing one spray pipe 20 is described, but a plurality of spray pipes 20 are installed by repeating steps S1301 to S1308.

In step S1309 (installing step), the worker carries a plurality of scaffold planks (foothold members) 60 from the outside of the absorption tower 10 via the manhole 15 into the absorption tower 10, and installs the scaffold planks on the upper end portions 21c of the pipe portions 21 of the spray pipes 20, as illustrated in FIG. 4. As illustrated in FIG. 3, the scaffold plank 60 is installed to be put across a plurality of spray pipes 20. The scaffold plank 60 is a member on which a worker gets to work in order to attach the spray nozzle 22a to the nozzle holder 22b of the pipe portion 21.

In step S1310 (attachment step), the worker in a state of getting on the scaffold plank 60 attaches the spray nozzle 22a to the nozzle holder 22b. The worker attaches the spray nozzle 22a to the nozzle holder 22b concerning a plurality of nozzle holders 22b provided on a plurality of nozzle holders 20 while moving over the scaffold plank 60. Note that in a case that provisional tightening is performed in step S1306 (coupling step) or step S1307 (coupling step), the final tightening is performed in each case for coupling. An order of final tightening is the same as that of provisional tightening.

After attaching the spray nozzles 22a to all of the nozzle holders 22b or after completing final tightening for the all fastening portions in the case of performing the final tightening described above, the worker carries a plurality of scaffold planks 60 via the manhole 15 out of the absorption tower 10. Then, the worker moves from the manhole 15 to the outside of the absorption tower 10, and ends processing of this flow.

The actions and effects exhibited by the method for installing the spray pipe 20 according to the above-described present embodiment will be described.

According to the method for installing the spray pipe 20 according to the present embodiment, the attachment flange 24 of the spray pipe 20 and the opening portion 14 of the absorption tower 10 are coupled by provisionally tightening the fastening portion 50 in the provisionally tightening step (S1304), and the axis line X1 along which the pipe portion 21 extends, in the provisionally tightened state, is adjusted to coincide with the horizontal plane in the adjusting step (S1305). The opening portion 14, which has a flange structure, can fix the absorption tower 10 and the spray pipe 20 the most rigidly as compared to the other supporting portions (pipe support 91, support beams 92 and 93), and therefore, provisionally determining initially the position of the spray pipe 20 with the opening portion 14 is effective to accurately attain the horizontality. The attachment surface 24a of the attachment flange 24 and the attachment surface 14d of the opening portion 14 each are surfaces along the vertical direction, and therefore, the axis line X1 along which the pipe portion 21 extends, which is brought into a state of being close to the horizontal direction, can be adjusted to coincide with the horizontal plane. The opening portion 14 configured to have a flange structure enables the spray pipe to be easily removed when the spray pipe is replaced in a case that slurry gets stuck in the spray pipe or the spray pipe is worn out through a long-term operation, which improves maintainability.

The leg portion 23 is coupled to the pipe support 91 after the adjustment in the adjusting step (S1305), and therefore, a state in which the axis line X1 along which the pipe portion 21 extends coincides with the horizontal direction can be reliably maintained. Furthermore, the fastening portion 50 is finally tightened after coupling the leg portion 23 to the pipe support 91, and therefore, the adjustment in the adjusting step (S1305) is easy and the failure that a local stress occurs in the spray pipe 20 when coupling the leg portion 23 to the pipe support 91 can be suppressed.

As described above, according to the method for installing the spray pipe 20 of the present embodiment, it is possible to accurately position the spray pipe 20 along the horizontal direction, the spray pipe 20 being capable of suppressing such a failure that a breakage is caused by a reaction force and an impactive force applied as the liquid absorbent is injected upward.

In the method for installing the spray pipe 20 according to the present embodiment, the leg portions 23 are disposed at a plurality of locations including the leading end 21a of the pipe portion 21, the absorption tower 10 includes a plurality of supporting portions (pipe support 91, support beams 92 and 93) corresponding to the leg portions 23 disposed at a plurality of locations, and the coupling step is of coupling the leg portions 23 to the supporting portions in an order from the leading end 21a of the pipe portion 21 toward the base end 21b.

With this method, after the attachment flange 24 on the base end 21b side of the spray pipe 20 is coupled to the opening portion 14 of the absorption tower 10, the leg portion 23 is coupled to the support portion at the leading end 21a which is the farthest from the base end 21b. Both ends of the spray pipe 20 can be coupled to the absorption tower 10 to reliably coincide with the horizontal plane, while the spray pipe 20 can be rigidly coupled to the absorption tower 10 at other portions.

The method for installing the spray pipe 20 according to the present embodiment includes the correction step (S1303) of correcting the attachment surface 24a and the attachment surface 14d to be disposed along the vertical direction before coupling the attachment flange 24 to the opening portion 14 in the provisionally tightening step (S1304).

With this method, the attachment flange 24 of the spray pipe 20 is attached to the opening portion 14 of the absorption tower 10 in a state in which the attachment surface 24a of the attachment flange 24 and the attachment surface 14d of the opening portion 14 are corrected to be disposed along the vertical direction. Therefore, the spray pipe 20 can be positioned more accurately along the horizontal direction.

In the method for installing the spray pipe according to the present embodiment, the fastening portion 70 (80) includes the fastening bolts 71 (81) and a pair of fastening nuts 73 and 74 (83 and 84) that are fastened on the fastening bolts 71 (81), and the insertion holes 23b into which the fastening bolts 71 (81) are inserted are formed on the installation surface 23a of the leg portion 23. The insertion hole 23b has the length L2 in the direction along the axis line X1 that is longer than the length L1 in the direction orthogonal to the axis line X1. The coupling steps (S1306, S1307) each are a step of tightening a pair of fastening nuts 73 and 74 (83 and 84) in a state in which the leg portions 23 are movable along axis line X1.

In this way, the leg portions 23 can be coupled to the supporting portion while the leg portions 23 are movable along the axis line X1. Therefore, in the case that the spray pipe 20 is thermally stretched along the axis line X1 due to the heat of the exhaust gas, the failure that a local stress occurs in the spray pipe 20 can be suppressed.

In the method for installing the spray pipe 20 according to the present embodiment, the spray pipe 20 includes a plurality of nozzle holders 22b which are disposed at a plurality of locations of the upper end portion 21c in the vertical direction of the pipe portion 21 and guide the liquid absorbent flowing through the pipe portion 21 in the horizontal direction, upward in the vertical direction, and the method includes the attachment step (S1310) of attaching the spray nozzle 22a to each of a plurality of nozzle holders 22b, the spray nozzle 22a injecting the liquid absorbent upward in the vertical direction.

With this method, the spray nozzle 22a can be attached to each of a plurality of nozzle holders 22b included in the spray pipe 20 in a state in which the spray pipe 20 is accurately positioned inside the absorption tower 10 along the horizontal direction. Therefore, such failures can be suppressed that installing the spray pipe 20 inside the absorption tower 10 while the spray nozzles 22a are attached to the spray pipe 20 makes installation work difficult, and that the spray nozzle 22a comes into contact with the opening portion 14 and is broken. When attaching the spray nozzle 22a to the spray pipe 20, the injection direction of the spray nozzle 22a can be easily coincided with the vertical direction.

In the above description, the desulfurization device 100 is a device using the lime-gypsum method in which the liquid absorbent containing lime is brought into gas-liquid contact with the exhaust gas to remove sulfur oxide contained in the exhaust gas, but may be another aspect. For example, the desulfurization device may be that using a seawater desulfurization method in which seawater containing an alkali component is used as the liquid absorbent.

In the description above, the attachment flange 24 of the spray pipe 20 is attached to the flange 14a of the opening portion 14 of the absorption tower 10, but other aspects are possible. For example, in a case that the flange 14a is not provided to the opening portion 14 of the absorption tower 10, a fastener may be used to directly attach the attachment flange 24 to the side wall of the absorption tower 10. In the case of a metallic spray pipe, the spray pipe may be welded and attached to the absorption tower 10. In a case of the absorption tower made of concrete, the spray pipe may be attached by being directly embedded in the absorption tower.

REFERENCE SIGNS LIST

10 Absorption tower
11 Exhaust gas introduction section
12 Exhaust gas discharge section
13 Bottom section
14 Opening portion
14a Flange
14b Lining portion
14c Gasket
14d Attachment surface (second attachment surface)
15 Manhole
20 Spray pipe
21 Pipe portion
21a Leading end
21b Base end
21c Upper end portion
21d Lower end portion
22 Nozzle portion
22a Spray nozzle
22b Nozzle holder
22c Gasket
23 Leg portion
23a Installation surface
23b Insertion hole
24 Attachment flange (attachment portion)
24a Attachment surface (first attachment surface)
25 Supply port
30 Demister
40 Circulation pump
50 Fastening portion (first fastening portion)
51 Fastening bolt
52 Washer 53 Fastening nut
60 Scaffold plank (foothold member)
70 Fastening portion (second fastening portion)
71 Fastening bolt
72, 75 Washer
73, 74 Fastening nut
80 Fastening portion (second fastening portion)
81 Fastening bolt
82, 85 Washer
83, 84 Fastening nut
91 Pipe support (supporting portion)
91a Supporting surface
92, 93 Support beam (supporting portion)
92a, 93a Supporting surface
99 Shim plate (plate-shaped member)
99a Cutout
100 Desulfurization device
CL Clearance gap
X1, X2 Axis line

The invention claimed is:

1. A method for installing a spray pipe, the spray pipe injecting a liquid absorbent into an absorption tower which is formed to extend in a vertical direction and serves as a passage for exhaust gas,
the spray pipe including
a cylindrical pipe portion extending along an axis line and including a leading end closed,
a leg portion disposed on a lower end portion in a vertical direction of the pipe portion including an installation surface, and
an attachment portion disposed at the pipe portion and including a first attachment surface, and
the absorption tower including
an opening portion opened toward a side of absorption tower,
a second attachment surface disposed at the opening portion, and
a supporting portion including supporting surface supporting the pipe portion,
the method comprising:
an insertion step of inserting the spray pipe from the opening portion;
a positioning step of positioning the spray pipe such that a state is established in which the installation surface of the leg portion faces the supporting surface of the supporting portion;
a provisionally tightening step of provisionally tightening a first fastening portion, in a state in which the first attachment surface of the attachment portion faces the second attachment surface of the opening portion, to couple the attachment portion to the opening portion;
an adjusting step of adjusting a height of the installation surface relative to the supporting surface such that the axis line along which the pipe portion extends coincides with a horizontal plane, in the provisionally tightened state resulting from the provisionally tightening step;
a coupling step of coupling the leg portion to the supporting portion with a second fastening portion after the adjusting step; and
a finally tightening step of finally tightening the first fastening portion after the coupling step.

2. The method for installing a spray pipe according to claim 1, wherein
the leg portion is disposed at each of a plurality of locations including the leading end of the pipe portion,
the absorption tower includes a plurality of the supporting portions each corresponding to the leg portion disposed at each of the plurality of locations, and
the coupling step is of coupling the leg portions to the supporting portions in an order from the leading end toward a base end of the pipe portion.

3. The method for installing a spray pipe according to claim 1, further comprising:
a correction step of correcting an angle of the second installation surface such that the axis line along which the pipe portion extends coincides with a horizontal plane before coupling the attachment portion to the opening portion in the provisionally tightening step.

4. The method for installing a spray pipe according to claim 1, wherein
the second fastening portion includes a fastening bolt and a pair of fastening nuts fastened on the fastening bolt,
an insertion hole into which the fastening bolt is inserted is formed on the installation surface of the leg portion,
the insertion hole has a length in a direction along the axis line that is longer than a length in a direction orthogonal to the axis line, and
the coupling step is a step of tightening the pair of fastening nuts in a state in which the leg portions are movable along the axis line.

5. The method for installing a spray pipe according to claim 1, wherein
the spray pipe includes a plurality of nozzle holders which are disposed at a plurality of locations of an upper end portion in the vertical direction of the pipe portion and guide the liquid absorbent flowing through the pipe portion in the horizontal direction, upward in the vertical direction, and
the method further comprising:
an attachment step of attaching a spray nozzle to each of the plurality of nozzle holders, the spray nozzle injecting the liquid absorbent upward in the vertical direction.

6. The method for installing a spray pipe according to claim 5, further comprising:
an installing step of installing a foothold member on which a worker gets to work, on the upper end portion in the vertical direction of the pipe portion of the spray pipe before attaching the spray nozzle in the attachment step.

* * * * *